US006814666B2

(12) United States Patent
Borg

(10) Patent No.: US 6,814,666 B2
(45) Date of Patent: Nov. 9, 2004

(54) MULTIPLE STAGED CUING METHOD AND MEANS FOR A GAMING MACHINE TOPPER

(76) Inventor: John D. Borg, 620 S. Woodlawn, Wheaton, IL (US) 60187

( * ) Notice: Subject to any disclaimer, the term of this patent is extended or adjusted under 35 U.S.C. 154(b) by 294 days.

(21) Appl. No.: 10/213,885

(22) Filed: Aug. 8, 2002

(65) Prior Publication Data

US 2004/0029641 A1 Feb. 12, 2004

Related U.S. Application Data

(63) Continuation-in-part of application No. 10/207,255, filed on Jul. 25, 2002.

(51) Int. Cl.[7] ................................................ A63F 13/00
(52) U.S. Cl. .......................................... 463/46; 463/20
(58) Field of Search ..................................... 463/46, 20

(56) References Cited

U.S. PATENT DOCUMENTS

| | | | | | |
|---|---|---|---|---|---|
| 3,918,716 | A | * | 11/1975 | Nonaka et al. | 463/21 |
| 4,208,833 | A | * | 6/1980 | Wolf | 446/136 |
| 5,320,351 | A | * | 6/1994 | Suzuki | 463/6 |
| 5,560,603 | A | * | 10/1996 | Seelig et al. | 463/6 |
| 6,318,721 | B1 | * | 11/2001 | Randall et al. | 273/148 R |
| 6,606,081 | B1 | * | 8/2003 | Jaeger et al. | 345/111 |
| 6,656,041 | B1 | * | 12/2003 | Kaminkow et al. | 463/16 |
| 6,702,409 | B2 | * | 3/2004 | Hedrick et al. | 312/223.1 |
| 2002/0065126 | A1 | * | 5/2002 | Miller et al. | 463/20 |
| 2002/0094856 | A1 | * | 7/2002 | Bennett et al. | 463/16 |
| 2002/0151354 | A1 | * | 10/2002 | Boesen et al. | 463/25 |
| 2003/0017865 | A1 | * | 1/2003 | Beaulieu et al. | 463/16 |
| 2004/0002373 | A1 | * | 1/2004 | Kaminkow | 463/20 |

* cited by examiner

*Primary Examiner*—Jessica Harrison
*Assistant Examiner*—Jason Skaarup
(74) *Attorney, Agent, or Firm*—Wood, Phillips, Katz, Clark & Mortimer

(57) ABSTRACT

Multiple staged follower magnets in a topper construction each constitute an award in and of itself. When stopped on selected sites assigned designated values increase the follower's value by multiplication in the visible cuing area, thereby increasing the available range of awards exponentially.

6 Claims, 4 Drawing Sheets

MULTIPLE STAGED CUING METHOD AND MEANS FOR A GAMING MACHINE TOPPER

CROSS-REFERENCE TO RELATED APPLICATIONS

This application is a continuation-in-part of my parent application entitled "Cuing Method and Means for a Gaming Machine Topper" filed Jul. 25, 2002, U.S. Ser. No. 10/207,255.

STATEMENT REGARDING FEDERALLY SPONSORED RESEARCH OR DEVELOPMENT

Not Applicable

BACKGROUND OF THE INVENTION

In my prior application, I disclosed an illuminated animation, or pointer/director, that requires no openings, routings, tracks, rails or other interruptions of an arted panel incorporated in a gaming machine topper. A single follower magnet initially hidden from the sight of the machine player until the player has earned entitlement is magnetically linked with a driver magnet movable over the plane of the topper art work. Upon eligibility of the player being established, the driver magnet enters the display field for animated actuation to cue the player as to potential rewards attainable upon continued play.

BRIEF SUMMARY OF THE PRESENT INVENTION

A staging area is utilized which houses multiple arted, or different colored pointer/directors, each connected to one of a corresponding plurality of appropriate independently movable follower magnets. A movable motorized X-Y driver magnet moves toward the staging area. Appropriately programmed software regulated controls stop the driver magnet at a selected follower magnet, whereupon it is magnetically linked to the driver magnet. The driver magnet then moves the chosen follower magnet and its pointer/director out of the staging area and into the display field.

Each follower magnet with its arted pointer/director is an award of designated worth in and of itself and may function as a multiplier to increase the value of earned sites in the visible display area, thereby cuing the player as to potential awards.

DETAILED DESCRIPTION OF THE INVENTION

Figure 1:
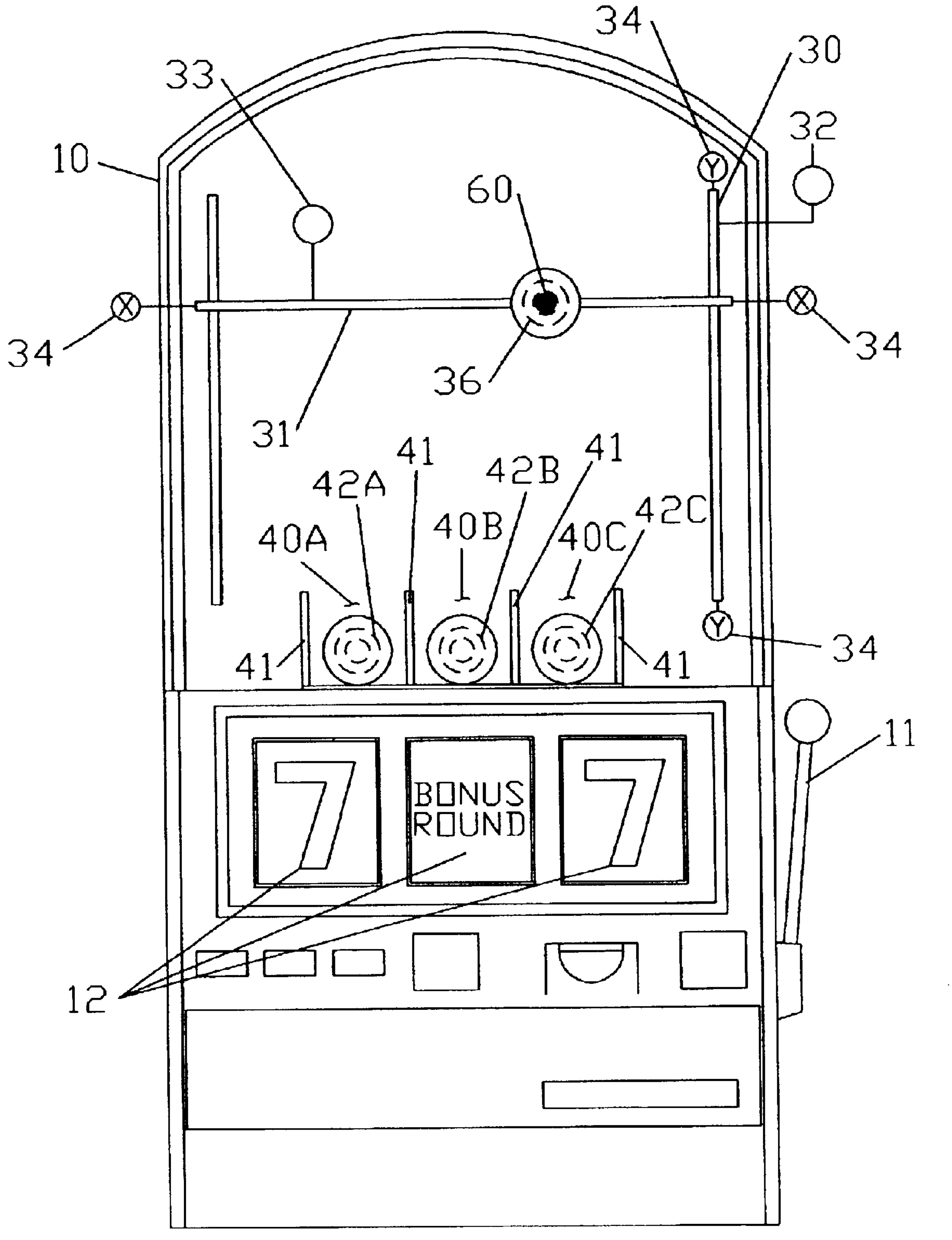
FIG. 1 is a front elevation view of a gaming machine but with the arted glass sheet removed to reveal additional details of the topper construction.

The environment in which this invention finds its greatest utility is described in more detail in my prior application and includes machines, games and entertainment devices in which a topper is used and on which an arted panel is utilized to attract players in an attract mode, and to cue players during play, whether or not such machines can be played for no charge, or whether the machines are accessed with the use of coins, tokens, or legal tender, and, in any event, wherein the topper is used to cue the player as to goals the player may achieve, or awards the player may receive upon operating the machine.

An exemplification of a typical gaming machine is shown at 10 and includes an actuating handle 11, or an equivalent push-button actuating switch operating a power assisting means, for driving and spinning mechanical or video symbols shown at 12. The object of the game is to align similar symbols in three separate columns in a single row.

A rear sheet-form glass or transparent plastic sheet 16 is erected as a planar member in a generally vertical disposition in the sight line of the machine player and is connected in firm assembly with the machine with which the topper is associated. While it may be understood that the sheet 16 could be disposed in a horizontal plane for use on a pin ball machine as described in my parent application, only the exemplary form of the present machine need be described in detail.

The sheet 16 has a rear side 16 R on which is affixed a physical layer, or coating, of pictorial art depicting any desired selected characteristics, thereby to provide an arted panel 18. The arted panel 18 provides an arted viewable display field constituting an award area which has a plurality of pre-determined sites 21 to which selected values are assigned and pre-programmed as part of the electrical control system of the machine. Thus, special values such as a bonus round of play, or other attainable goals can be revealed to the player when appropriately cued.

A front sheet-form glass or transparent plastic sheet 17 is erected in parallel spaced relation to the sheet 17 and it also has an arted panel providing a display field through which the arted panel 18 may be viewed and an opaque non-viewable staging area which is disposed at the bottom of the display field.

Figure 2:
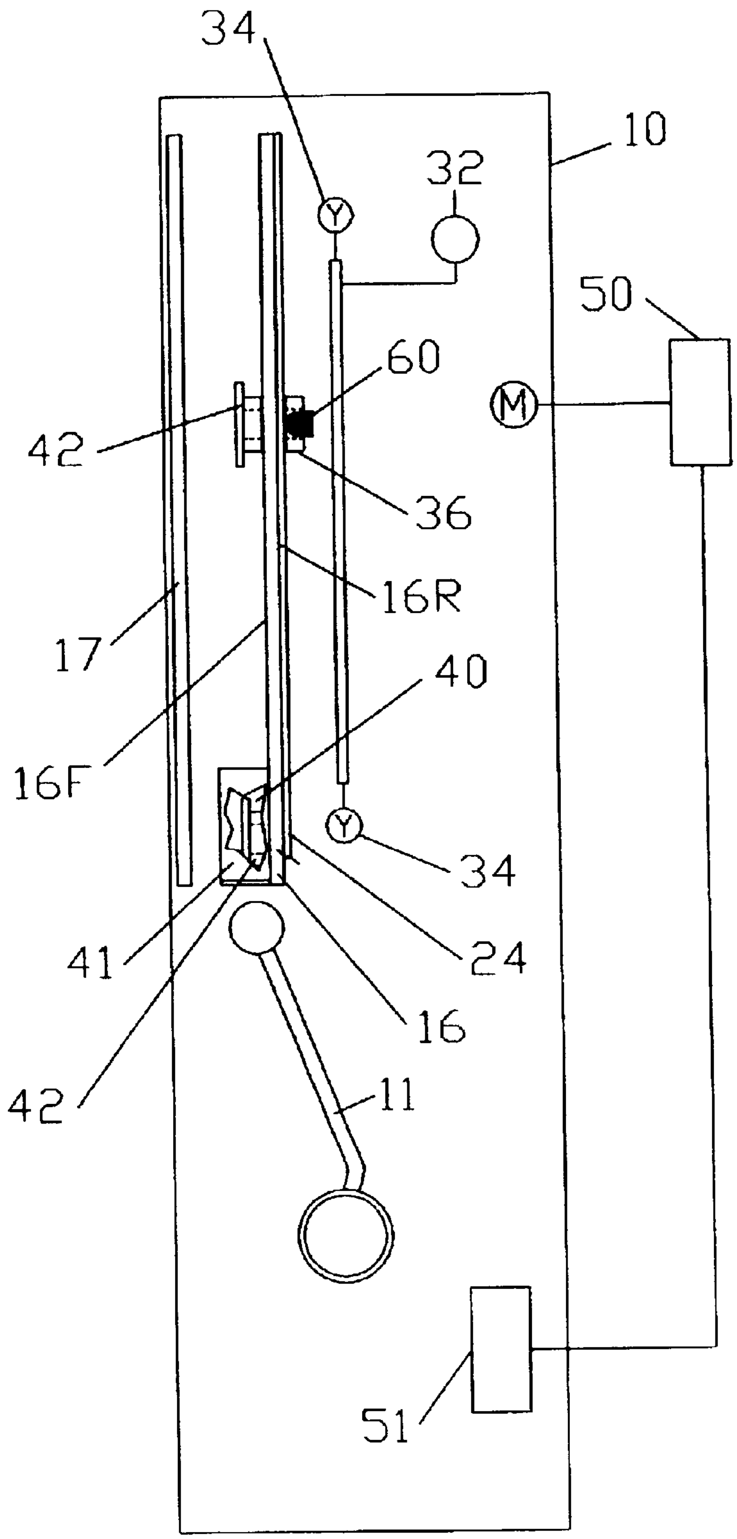
FIG. 2 is a side elevation view of the machine of FIG. 1, but with the arted glass in assembled position as part of the topper construction.

In order to protect the arted panel 18, a thin protective sheet 24 may be provided as shown in FIG. 2 which may be made of a plastic material such as a clear acrylic, or a PETG (Polyethylene Toluene Glycol) plastic. The glass or plastic sheet 16 is clear and transparent so that the arted panel 18 may be clearly visible to the player through the front side 16 F of the glass or plastic sheet 16 and the front sheet 17 while positioned in operating relationship to the machine. Moreover, the arted panel 18 and the arted portion of the front sheet 17 are sufficiently opaque that any operating mechanism forming a part of the topper construction may be effectively shielded and concealed and will be hidden from the player's sight.

As in my parent application, a suitable driving mechanism is provided such as a dual rack system or a cranking mechanism. However, in this exemplification the driving system is a dual rack system having a motor driven vertical rack 30 and a motor driven horizontal rack 31, each powered by a suitable electric gear motor and/or electric stepping motor 32, and 33, respectively. The dual rack system provides a basis for movement on an X-Y axis relative to the glass or plastic sheet 16 behind which it is positioned. It will be understood that opto switches identified schematically at 34 are used as end and limit switches. The racks 30 and 31 are disposed respectively on X and Y axes.

Figure 3:
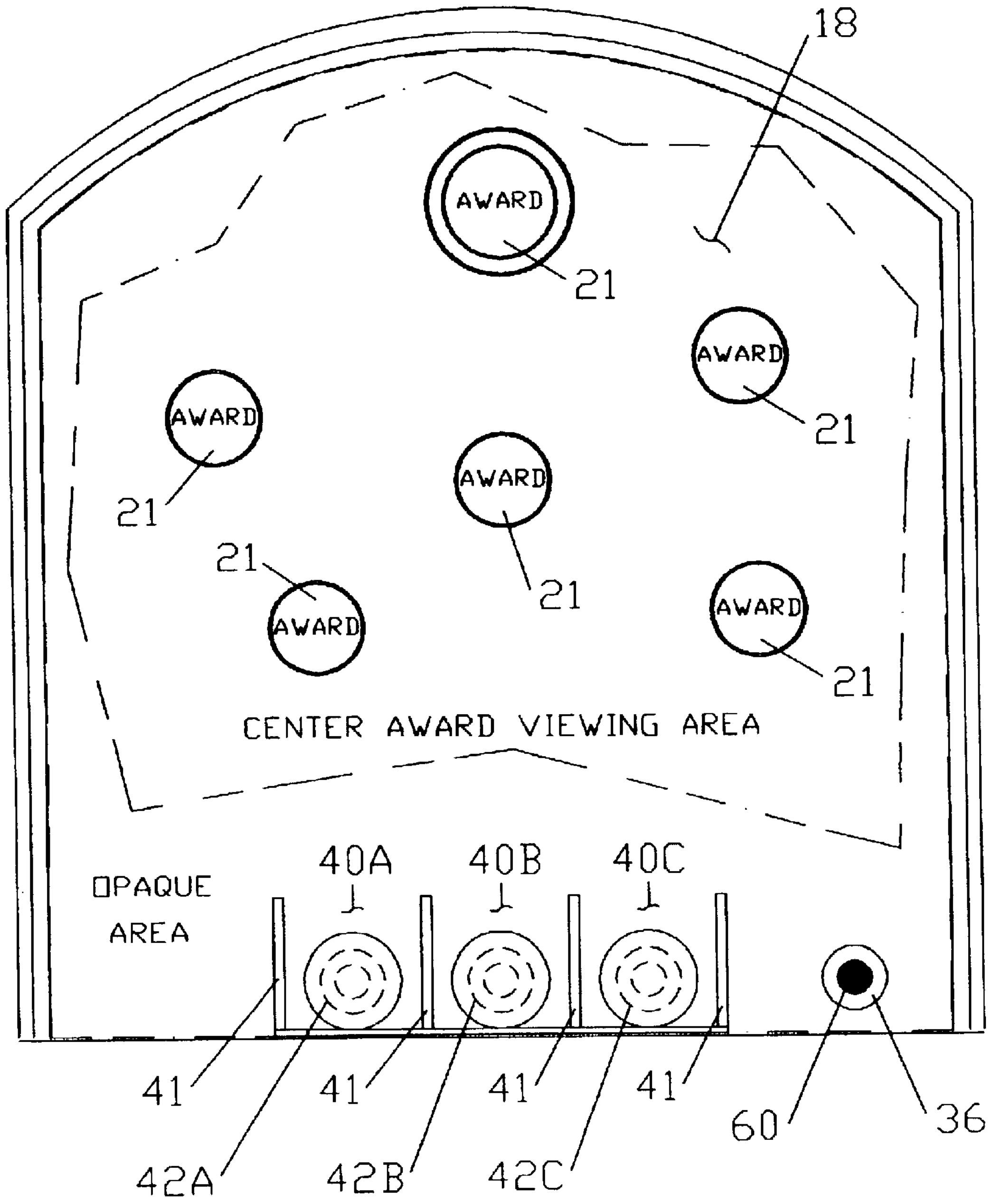
FIG. 3 is a fragmentary front view with parts broken away showing additional details of the staging or keeper area housing multiple pointer/director follower magnets.
Figure 4:
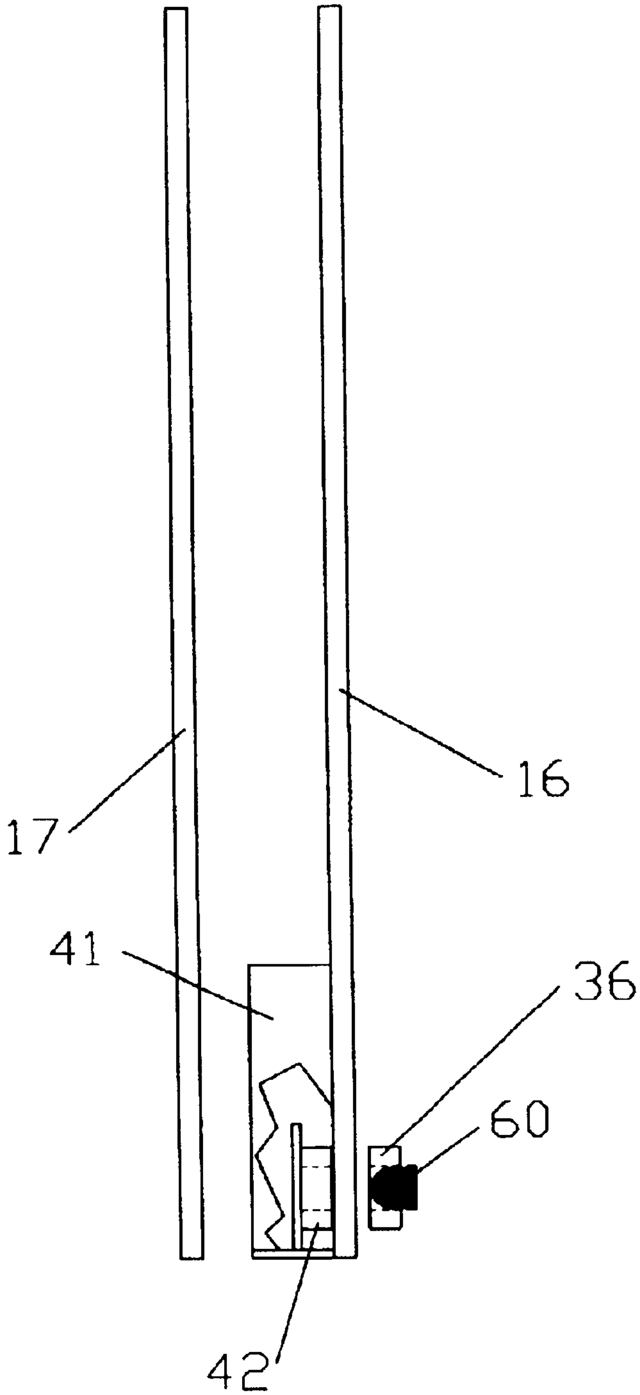
FIG. 4 is a cross-sectional view taken on line IV—IV of FIG. 3.

In order to provide a driver, a first magnet comprising either a ceramic ring-type permanent drive magnet, or an electro-drive-magnet 36, is supported on the motorized dual rack system behind the arted glass or plastic sheets 16 and 17. If an electromagnet is utilized, it will be powered by the usual electrical source of supply for the machine, since the drive magnet and any trailing electrical conduits or wires, are concealed from the player. The drive magnet 36 functions as a master magnet and is disposed to travel on, or in closely spaced relation to, the flat surface of the protective sheet 24 so that the topper's arted panel 18 is protected from behind. In this regard, by choosing a form of drive magnet of sufficient strength, the drive magnet 36 may be sufficiently spaced from the arted panel 18 to avoid rubbing contact therewith, thereby obviating the necessity of providing an additional protective sheet 24 as in FIGS. 3 and 4. The driver magnet 36 has a bright led lamp 60 to illuminate any particular chosen site 21.

In accordance with this invention, a staging area is formed by a plurality of separate parking, or storage, stations 40*a*, 40*b*, and 40*c* disposed at the lower portion of the topper and hidden from the player behind the opaque areas of the front sheet 17 and within the opaque area of the rear sheet 16. For example, each parking station is separated from the station adjacent thereto by a partition wall 41 extending between the front sheet 17 and the rear sheet 16. As many partition walls 41 and staging stations 40 ("a" et seq.) as can be readily accommodated by the machine may be utilized. In each station, or parking place, there is provided a corresponding staged follower magnet 42*a*, 42*b*, and 42*c* which may be passively stored or parked in an allotted station when not in actual play under the control of the player of the machine.

The follower magnets are color coded, if desired, and are suitably arted with supplementation so that they may each function as a pointer/director appropriate to the theme of the machine. Moreover, they are assigned designated values selected to be pre-programmed and which values are integrated within the computerized electrical control system of the machine.

In operation, the movable motorized driver magnet 36 driven on the X-Y axes established by the racks 30 and 31 moves towards the staging area. Under the control of software 50 forming part of the programmable control means shown schematically as constituting an electrical control system 51, the driver magnet 36 is stopped at a designated one of the multiple stations 40*a*, 40*b*, or 40*c* in the staging area. The follower magnet housed in that selected station, either follower magnet 42*a*, 42*b*, or 42*c*, will then be magnetically linked to the driver magnet 36. When so linked, the driver magnet 36 and the chosen follower magnet 42(*a, b* or *c*) are locked in a master/slave relation.

Together, the driver magnet 36 and the chosen follower magnet 42(*a, b*, or *c*) will move in unison upwardly out of the non-viewable staging area and into the viewable display field. Once in the display field, the follower magnet and its arted supplementation operates as a pointer/director and is visible to the player, thereby cuing the player as to attainable values.

Each follower magnet is an award of designated value in and of itself. For example, when the follower magnet stops on the site of a value appearing on the display field, the follower magnet operates as a multiplier to increase the achieved value thus displayed by a multiplication factor represented by the chosen follower magnet.

Thus, by having multiple follower magnets housed in a staging area and with each being selectively chosen as a function of successfully playing the gaming machine, the scoring opportunities and the achievable range of goals is increased exponentially for the venturesome player.

Although minor modifications might be suggested by those versed in the art, it should be understood that I wish to embody within the scope of the patent warranted hereon all such modifications as reasonably and properly come within the scope of my contribution to the art.

What is claimed is:

1. In a topper construction for a gaming machine, front and rear sheet-form articles forming an arted viewable display field award area and an opaque non-viewable staging area, said sheet-form articles being disposed in front of the player of the gaming machine, partition means forming a plurality of stations between said sheet-form articles in said non-viewable area, a driver magnet on the rear side behind said rear sheet-form articles, motorized drive means for selectively driving said driver magnet in closely spaced parallel relation to said rear sheet-form article, a corresponding plurality of independently movable follower magnets normally passively housed in parked relation with each in a corresponding one of said stations, and control means for regulating said driver magnet to selectively choose and magnetically link one of said follower magnets as a selected follower magnet, said control means together with said driver magnet activating said selected follower magnet together moving in unison into the viewable area for cuing the player as to achievable awards modified as a function of the said selected follower magnet, each of said follower magnets having different modifying factors to enhance the achievable awards available to the machine player.

2. Cuing topper means for a gaming machine comprising, a topper having an arted sheet-form plate means mounted in the viewable vision of the player operating the gaming machine, said plate means having a planar viewable area forming a display field having one or more sites and a planar non-viewable area forming a parking area, drive means including a first driving magnet on one side of the sheet-form plate means and being movable relative to said plate means over its entire planar expanse, a plurality of second follower magnets parked in said non-viewable area of said plate means, means magnetically linking said first driving magnet with a selected one of said second follower magnets to move in synchronism therewith, and programmable control means actuating said drive means and controlling the selection of the follower magnet for pre-selecting attainable goals represented by sites on the display field but modified as a function of the selected operation of the gaming machine with different follower magnets, whereby the selected second follower magnet will cue the player as a function of that specific selected second follower magnet.

3. Cuing topper means as defined in claim 2 wherein said sheet-form plate means is disposed vertically and said drive means comprises a dual rack system having vertical and horizontal motor driven racks disposed on X-Y axes, said selected second follower magnet moving into the display field to cue the player as a function of the selected second follower magnet.

4. Cuing topper means as defined in claim 2, wherein said drive means comprises a cranking system having a driver magnet driven by an electric cranking motor, said second follower magnet moving out of the parking area into the display field to cue the player as a function of the selected second magnet.

5. A topper mechanism for combination with a gaming device comprising a dual X-Y rack system having an actuator powered by electric motors to provide movement of said actuator on X-Y axes, a driving magnet supported on said actuator, a vertical transparent sheet in front of said rack system to provide an arted screen formed on its back surface and providing an artistic display field in which selected different cue values are disposed in spaced apart relation in the display field, a plurality of secondary follower magnets on the front side of said transparent sheet parked in a staging area hidden from the sight of the gaming machine player, each said follower magnet being arted to form a distinctively different pointer/director movable on the front face of the arted display field, said driving and each of said follower magnets being selectively magnetically linked in a master/slave relation to move in unison relative to said display field, and programmable control means regulating said dual rack system in synchronism with the gaming device, whereby the player of the device may be automatically cued as to values, or features and places the player will be awarded while operating the gaming device as a function of the values in the field and as modified by the selected second follower magnet.

6. The method of providing illuminated cuing animation on the topper screen of a gaming device and having a display field viewable by the player of the device and a non-viewable area hidden from the player which includes the steps of:

(A) providing a planar art screen displaying values at spaced apart sites within the display field which are attainable by the player, (B) locating a plurality of independently movable pointers on one side of the art screen each movable relative to the display field to selectively designate a site and parked in the non-viewable area hidden from the player, (C) locating a driving mechanism having a driving magnet on the opposite side of the art screen, (D) selectively linking said driving magnet on the said driving mechanism and a selected one of said movable pointers, (E) moving the selected one of said movable pointers out of the non-viewable area and placing it in play within the display field, and (F) controlling the drive motor in synchronism with the gaming machine, whereupon said pointer is corresponding moved to visibly cue the player as to attainable values in functional relationship to the selected one of said pointers.

* * * * *